(12) United States Patent
Mimatsu

(10) Patent No.: US 8,504,797 B2
(45) Date of Patent: Aug. 6, 2013

(54) METHOD AND APPARATUS FOR MANAGING THIN PROVISIONING VOLUME BY USING FILE STORAGE SYSTEM

(75) Inventor: Yasuyuki Mimatsu, Cupertino, CA (US)

(73) Assignee: Hitachi, Ltd., Tokyo (JP)

( * ) Notice: Subject to any disclaimer, the term of this patent is extended or adjusted under 35 U.S.C. 154(b) by 1016 days.

(21) Appl. No.: 12/476,420

(22) Filed: Jun. 2, 2009

(65) Prior Publication Data

US 2010/0306500 A1  Dec. 2, 2010

(51) Int. Cl.
*G06F 12/08* (2006.01)

(52) U.S. Cl.
USPC .......................... 711/207; 707/827; 709/213

(58) Field of Classification Search
None
See application file for complete search history.

(56) References Cited

U.S. PATENT DOCUMENTS

| 6,725,328 | B2 | 4/2004 | Kano et al. | |
| 7,130,960 | B1* | 10/2006 | Kano | 711/112 |
| 7,519,787 | B2* | 4/2009 | Yamane et al. | 711/165 |
| 8,108,640 | B1* | 1/2012 | Holl, II | 711/162 |
| 8,140,790 | B2* | 3/2012 | Ikeda et al. | 711/162 |
| 2009/0077327 | A1* | 3/2009 | Hara | 711/154 |

* cited by examiner

*Primary Examiner* — Gary Portka
(74) *Attorney, Agent, or Firm* — Mattingly & Malur, PC

(57) ABSTRACT

In one embodiment, a method of operating block-based thin provisioning disk volumes in a system including a first storage system which is connected via a network to a second storage system comprises, in response to a volume creation request to create a thin provisioning disk volume in the first storage system, recording in the first storage system attribute information of the block-based thin provisioning disk volume; specifying a directory path for the block-based thin provisioning disk volume in a file system in the second storage system; and creating a directory for the block-based thin provisioning disk volume under the specified directory path.

20 Claims, 16 Drawing Sheets

2008

| Volume ID | File-based | Volume Size | File size | Provider 1 | Provider 2 | Current Provider | Compression algorithm | Other Info. |
|---|---|---|---|---|---|---|---|---|
| Vol.0 | YES | 500GB | 128 | http://www1.example.com/ | http://www2.example.com/ | 1 | Zip | ... |
| Vol.1 | YES | 500GB | 8 | http://www3.example.com/ | N/A | 1 | None | ... |
| ... | | | | | | | | |

Fig. 3 http://<base URL> / <storage ID> / <volume ID> / DiskBlock-<Block #> . <extension>
    ‾6001           ‾6002         ‾6003              ‾6004         ‾6005

Fig. 6a

Block # = LBA / <file size>

Fig. 6b

| LBA | File name (without extension) |
|---|---|
| 0 | |
| 1 | |
| 2 | |
| 3 | DiskBlock-0 |
| 4 | (File size: 8) |
| 5 | |
| 6 | |
| 7 | |
| 8 | |
| 9 | |
| ... | DiskBlock-1 |
| 15 | |
| 16 | |
| ... | DiskBlock-2 |
| 23 | |
| 24 | |
| ... | |

(6006 → LBA column, 6007 → File name column)

Fig. 6c

| 10002 | | | | | | |
|---|---|---|---|---|---|---|
| Volume ID (3001) | File-based (3002) | Volume Size (3003) | File size (3004) | Block group size (11001) | Base directory (11002) | Other Info. (3009) |
| Vol.0 | YES | 500GB | 64KB | 256 | /mnt/NAS1/dir1 | ... |
| Vol.1 | YES | 500GB | 16KB | 64 | /mnt/NAS2/dir2 | ... |
| ... | | | | | | |

Fig. 11

| 10003 | | | | | |
|---|---|---|---|---|---|
| | NAS Address ~12001 | File system ~12002 | Mount point ~12003 | Protocol ~12004 | Available capacity ~12005 |
| | NAS1 | /dir1 | /mnt/NAS1/dir1 | NFS | 500GB |
| | NAS2 | /dir2 | /mnt/NAS2/dir2 | CIFS | 1TB |
| | ... | | | | |

Fig. 12

/<u><base dir></u> / <u><storage ID></u> / <u><vol. ID></u> / <u><block group #></u> / <u>DiskBlock-<Block #></u>
 13001  13002  13003   13004   13005

Fig. 13a

Block # = LBA / <file size>

Block group # = <Block #> / <block group size>

Fig. 13b

| LBA | File name | Block group # |
|---|---|---|
| 0 | DiskBlock-0 | |
| 1 | (File size: 2) | |
| 2 | DiskBlock-1 | 0 |
| 3 | | (Block group size: 4) |
| 4 | DiskBlock-2 | |
| 5 | | |
| 6 | DiskBlock-3 | |
| 7 | | |
| 8 | DiskBlock-4 | |
| 9 | | 1 |
| ... | | |
| 15 | | |
| 16 | | |
| ... | | 2 |
| 23 | | |
| 24 | | |
| ... | | |

Fig. 13c

METHOD AND APPARATUS FOR MANAGING THIN PROVISIONING VOLUME BY USING FILE STORAGE SYSTEM

BACKGROUND OF THE INVENTION

The present invention relates generally to methods and apparatuses for managing disk volumes in computer storage systems and, more particularly, to methods and apparatuses for managing and operating block-based thin provisioning disk volumes in file-based storage systems.

Some of today's computer storage systems are able to provide a "virtual volume" or "thin provisioning volume" which is recognized as a fixed-capacity disk volume by host computers but its actual capacity is dynamically allocated when data is written to the volume. The unit of allocation is a "disk block" which is a segment of one or more disk drives in the storage system. The storage system manages the mapping of every part of the virtual volumes and disk blocks. When a host computer reads a part of the virtual volume and any disk block has not been allocated to the part yet, the storage system returns "0"s as if the part were filled by "0"s. Since disk blocks are allocated as needed, the capacity of disk drives can be used effectively by eliminating the need to allocate disk capacity to free areas of volumes. Furthermore, the capacity of the storage system is flexibly shared by multiple virtual volumes. An administrator does not have to precisely predict the necessary capacity for each volume at volume creation, and may create very large virtual volumes since virtual volumes consume capacity not based on the size of the volumes, but based on the used capacity. By increasing the efficiency of capacity consumption and reducing the initial investment and the administrative cost, thin provisioning reduces the TCO (total cost of ownership) of the computer storage system. The fundamental technology of the dynamic capacity allocation is disclosed in, for instance, U.S. Pat. No. 6,725,328.

Another method to reduce the TCO is through the use of "online storage service" or "cloud storage service" which provides storage capacity in a remote site that allows users to use the service through the Internet. Users of the service do not have to manage the service infrastructure. Furthermore, such service typically has a file-based interface and a charge back system such as pay-as-you-go, which means that the amount of payment is determined by the amount of total size of files. That reduces the TCO based on the same characteristics that thin provisioning has. One example of such a storage service is Amazon S3 (Simple Storage Service). See Amazon Simple Storage Service, http://aws.amazon.com/s3/.

In order to improve the efficiency of capacity consumption in a thin provisioning volume, the size of the disk block should be small. The use of smaller disk blocks, however, needs a larger amount of memory to store mapping information. That increases the cost of storage system against the purpose of thin provisioning. On the other hand, the online storage service also has a disadvantage. The user must use its file-based interface defined by the service provider. It is often not compatible with the standard file system interface such as NFS or CIFS, and lacks some functions which standard file systems have, such as access control, metadata management, replication, and so on.

BRIEF SUMMARY OF THE INVENTION

Exemplary embodiments of the invention provide methods and apparatuses for managing and operating block-based thin provisioning disk volumes in file-based storage systems. In one embodiment, the storage system provides a thin provisioning disk volume which stores disk blocks as files in the online storage service. Mapping information does not have to be recorded in the storage system because the existence or absence of a file for a disk block represents the allocation or release of the block. By checking for the existence of a disk block file in the storage service, the storage system can determine whether the disk block is already allocated or not. The storage service can be replaced by some other file-based storage such as NAS which has an NFS or CIFS interface. This invention provides a method and apparatus which has thin provisioning capability with small amount of memory. The user can access online storage service through block-based interface so that the user can build any kind of file system on the storage service.

One aspect of the present invention is directed to a method of operating block-based thin provisioning disk volumes in a system including a first storage system which is connected via a network to a second storage system. The method comprises, in response to a volume creation request to create a thin provisioning disk volume in the first storage system, recording in the first storage system attribute information of a block-based thin provisioning disk volume; specifying a directory path for the block-based thin provisioning disk volume in a file system in the second storage system; and creating a directory for the block-based thin provisioning disk volume under the specified directory path.

In some embodiments, the attribute information of the block-based thin provisioning disk volume is stored in a disk volume table and comprises at least one of a volume ID of the block-based thin provisioning disk volume; a file-based flag indicating that each disk block in the block-based thin provisioning disk volume is stored as a disk block file in the file system in the second storage system; a volume size of said each disk block; a file size representing a number of sectors in each disk block file stored in the second storage system; for each storage service provider, a part of a file path for each disk block file stored therein; or a compression algorithm for compressing data in each disk block. The file path is a URL which includes a base URL of the second storage system, a storage ID of the first storage system, a volume ID of the block-based thin provisioning disk volume in the first storage system, a file name including or based on a disk block number of the disk block stored as the disk block file in the second storage system, and an extension representing a compression algorithm used to compress the disk block. The attribute information of the block-based thin provisioning volume further comprises a current provider indicating the storage service provider currently accessed.

In specific embodiments, the disk block files are grouped into disk block groups and the file path further includes a disk block group number of the disk block group to which the disk block belongs. The attribute information of the block-based thin provisioning disk volume further comprises at least one of: for each disk block group, a disk block group size which defines a number of disk block files in the disk block group; or for each disk block group, a base directory for the disk block group.

In specific embodiments, the second storage system is one of a plurality of network-attached storage systems. The file path includes a base directory for each file system in the network-attached storage systems.

In some embodiments, the method further comprises, in response to a volume deletion request to delete a block-based thin provisioning disk volume in the first storage system, deleting all disk block files and the directory stored in the second storage system for the block-based thin provisioning disk volume specified in the volume deletion request, and deleting the attribute information of the block-based thin provisioning disk volume.

In specific embodiments, the method further comprises receiving a request selected from the group consisting of a volume discovery request, a shutdown request, and a file system table management request. If the request is a volume discovery request, the method comprises reading a configuration file which contains ID of the storage system(s) specified in the volume discovery request or ID of the first storage system which receives the volume discovery request in each mount point of one or more file systems exported by the second storage system(s), selecting a configuration file from the read configuration files which has a newest timestamp and recording values of the selected configuration file to the file system table and the disk volume table, and renaming directories under each base directory from an ID specified in the configuration file to an ID of the first storage system. If the request is a shutdown request, the method comprises storing a configuration file which includes a file system table for recording file system information of the second storage system, the disk volume table, a storage system ID of the first storage system, and a current time in each mount point for mounting a file system which is recorded in the file system table, and unmounting all file systems and shutting down the first storage system, i.e., the storage system which receives the shutdown request itself. If the request is a file system table management request, the method comprises sending current values in a file system table for recording file system information of the second storage system to a management server connected to the network, receiving new values from the management server and recording the new values in the file system table, and mounting file systems specified in the file system table.

In some embodiments, in response to a block read request to read data in the block-based thin provisioning disk volume in the first storage system, the method further comprises retrieving a start logical block address and size to be read from the read request; identifying one or more disk block files of the block-based thin provisioning disk volume to be read; reading each disk block file from the second storage system; if the reading is successful, storing the disk block read into a buffer memory; if the reading fails because the disk block file of the block-based thin provisioning disk volume to be read does not exist, storing zeros into a buffer memory; and returning the data stored in the buffer memory to an application server.

In specific embodiments, in response to a block write request to write data in the block-based thin provisioning disk volume in the first storage system, the method further comprises retrieving a start logical block address, size of data, and data to be written from the write request; identifying one or more disk block files of the block-based thin provisioning disk volume to be written; dividing the data into data blocks; and writing each of the divided data blocks as the identified disk block file to the second storage system.

In accordance with another aspect of the invention, a system of operating block-based thin provisioning disk volumes comprises a first storage system; a second storage system; and a network connecting the first storage system and the second storage system. In response to a volume creation request to create a thin provisioning disk volume in the first storage system, the first storage system records attribute information of the block-based thin provisioning disk volume in the first storage system. The first storage system specifies a directory path for the block-based thin provisioning disk volume in a file system in the second storage system. The first storage system creates a directory for the block-based thin provisioning disk volume under the specified directory path.

Another aspect of the invention is directed to a computer-readable storage medium storing a plurality of instructions for controlling a data processor to operate block-based thin provisioning disk volumes in a system including a first storage system which is connected via a network to a second storage system. The plurality of instructions comprise instructions that cause the data processor, in response to a volume creation request to create a thin provisioning disk volume in the first storage system, to record in the first storage system attribute information of the block-based thin provisioning disk volume; instructions that cause the data processor to specify a directory path for the block-based thin provisioning disk volume in a file system in the second storage system; and instructions that cause the data processor to create a directory for the block-based thin provisioning disk volume under the specified directory path.

These and other features and advantages of the present invention will become apparent to those of ordinary skill in the art in view of the following detailed description of the specific embodiments.

BRIEF DESCRIPTION OF THE DRAWINGS

FIG. 3 shows an example of the disk volume table according to the first embodiment.

FIG. 6a shows an example of the format of the URL which identifies a file in a storage service provider site according to the first embodiment.

FIG. 6b shows an expression for computing the disk block number.

FIG. 6c shows an example of a file name for each LBA (Logical Block Address) in a volume whose file size is 8, i.e., 4 kB.

FIG. 11 shows an example of the disk volume table according to the second embodiment.

FIG. 12 shows an example of the file system table.

FIG. 13a shows an example of the format of the file path which identifies a file in a NAS according to the second embodiment.

FIG. 13b shows an expression for computing the disk block number and an express for computing the disk group number.

FIG. 13c shows an example of a file name and block group number for each LBA (Logical Block Address) in a volume whose file size is 2, i.e., 1 kB, and the block group size is 4.

DETAILED DESCRIPTION OF THE INVENTION

Figure 1:
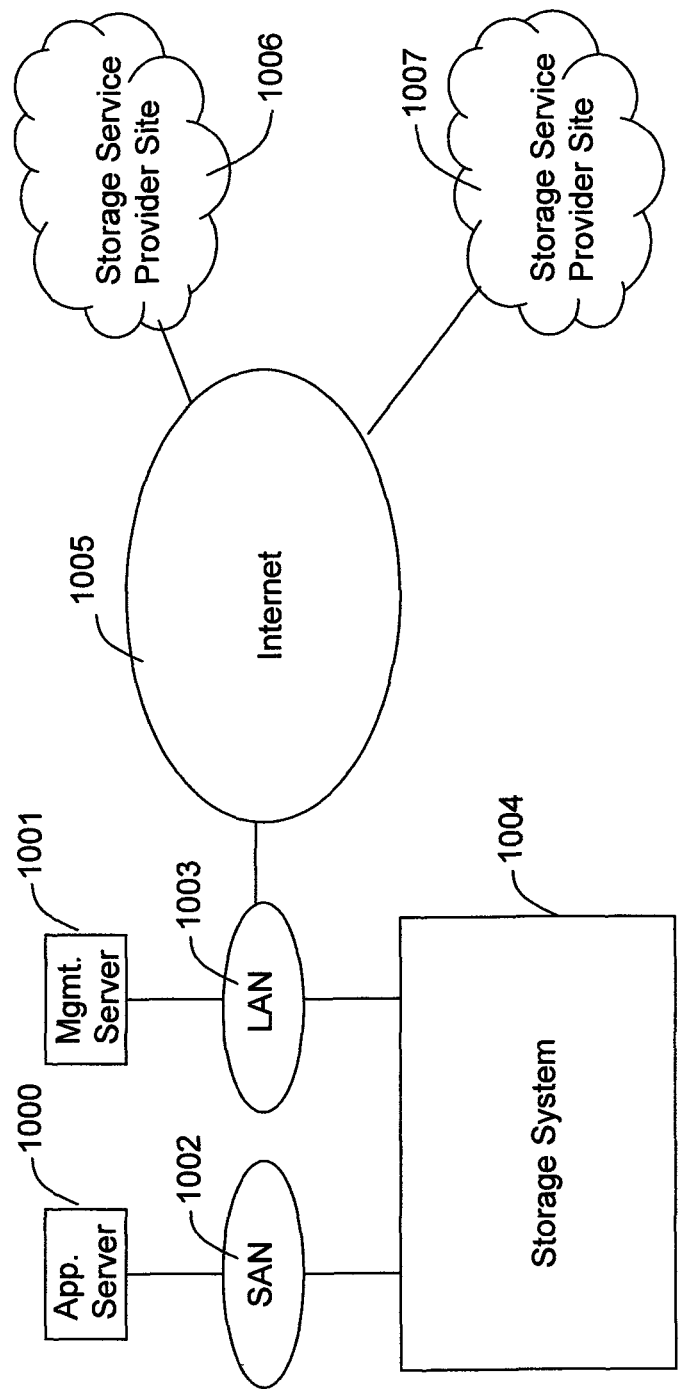
FIG. 1 illustrates an example of a hardware configuration of a computer system in which the method and apparatus of the invention may be applied according to a first embodiment of the invention.

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment", "this embodiment", or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing", "computing", "calculating", "determining", "displaying", or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for managing and operating block-based thin provisioning disk volumes in file-based storage systems.

First Embodiment

In the first embodiment, a storage system is connected to two storage service providers which replicate files form one to another. The storage system provides a thin provisioning volume, and an application server reads and writes data from the thin provisioning volume through a block-based interface such as SCSI. The storage area of the thin provisioning volume is divided into disk blocks. Data in each disk block can be compressed by a specified compression algorithm to reduce the amount of transferred and stored data. The data is stored as a file by using the storage service. The interface of the storage service is HTTP-based. If the connection to one of the providers is terminated, the storage system accesses the replica of the data in another storage service provider.

1. System Structure

FIG. 1 illustrates an example of a hardware configuration of a computer system in which the method and apparatus of the invention may be applied according to the first embodiment. The system includes a storage system 1004, and an application server 1000 which is connected to a Fibre Channel interface of the storage system 1004 through a Storage Area Network (SAN) 1002. A management server 1001 is connected to a LAN interface of the storage system 1004 through a local Area Network (LAN) 1003. The management server 1001 provides a user interface to an administrator of the system so that the administrator can create and delete a thin provisioning volume and change other configurations of the storage system 1004. The LAN 1003 is connected to two storage service provider sites 1006 and 1007 through the Internet 1005. The implementation of the storage service is outside the scope of this discussion, but is known in the art. In this embodiment, it is assumed that files in the service provider sites are read and written by using an HTTP-based protocol such as WEBDAV. Each file can be identified and accessed by specifying a URL. One site contains the replica of the other. If a file is written to a site, the storage service simply copies the file to the other site. The direction of the replication can be controlled for each directory in the site by sending a request to one of the two sites. The replica file is identified by the same URL of the original file except the part of the FQDN (fully qualified domain name).

Figure 2:
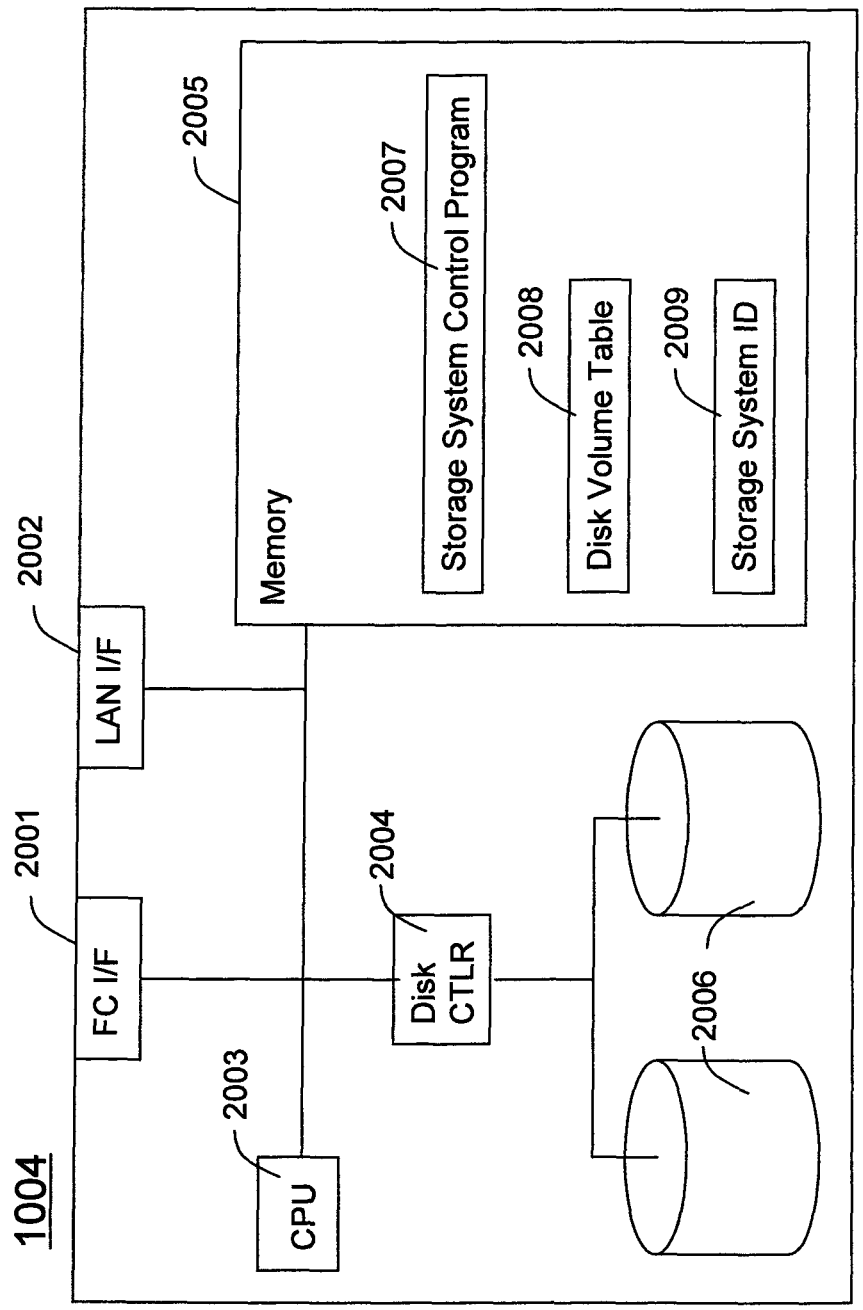
FIG. 2 shows the configuration of an exemplary storage system in the computer system of FIG. 1.

FIG. 2 shows the configuration of an exemplary storage system 1004 in the computer system of FIG. 1. It has disk drives 2006 controlled by a disk controller 2004. A Fibre Channel interface 2001 is connected to the SAN 1002 and receives requests from the application server 1000. The LAN interface 2002 is connected to the LAN 1003 and receives requests from the management server 1001. The LAN interface 2002 is also used to communicate with the storage service provider sites 1006, 1007. The CPU 2003 executes the storage system control program 2007 in the memory 2005. The storage system control program 2007 processes block-based READ and WRITE requests sent from the application server 1000 and management requests sent from the management server 1001, and sends requests to the storage service provider sites 1006, 1007. The memory 2005 contains a disk volume table 2008 and a storage system ID 2009. The storage system ID 2009 is a unique identifier of the storage system 1004.

FIG. 3 shows an example of the disk volume table 2008 according to the first embodiment. For each disk volume, the table lists the volume ID 3001, file-based flag 3002 which indicates whether the volume is a thin provisioning volume provided by using the storage service or not, volume size 3003, file size 3004 which represents the number of sectors in each disk block file stored in the storage service provider sites, the first provider 3005 and second provider 3006 which contain base URLs of each file in the first and second provider sites, respectively, current provider 3007 which indicates one site of the two which is currently accessed, compression algorithm 3008, and other information 3009 which contains the necessary information for conventional disk volume management (e.g., FC port used, LUN assigned to the volume, and so on).

FIG. 6a shows an example of the format of the URL which identifies a file in a storage service provider site according to the first embodiment. Each volume is assigned a directory whose name is identical to the ID of the volume. All disk block files of the volume are stored in the directory. The URL of a disk block file includes the base URL 6001, storage ID 6002, volume ID 6003, and file name which consists of consistent strings "DiskBlock-" followed by the disk block number of the file 6004, and extension 6005 which represents the algorithm used to compress the disk block. The disk block number is obtained by the expression shown in FIG. 6b. FIG. 6c shows an example of a file name for each LBA (Logical Block Address) in a volume whose file size is 8, i.e., 4 kB. Each file contains eight 512-byte sectors.

2. Process Flows

Figure 4:
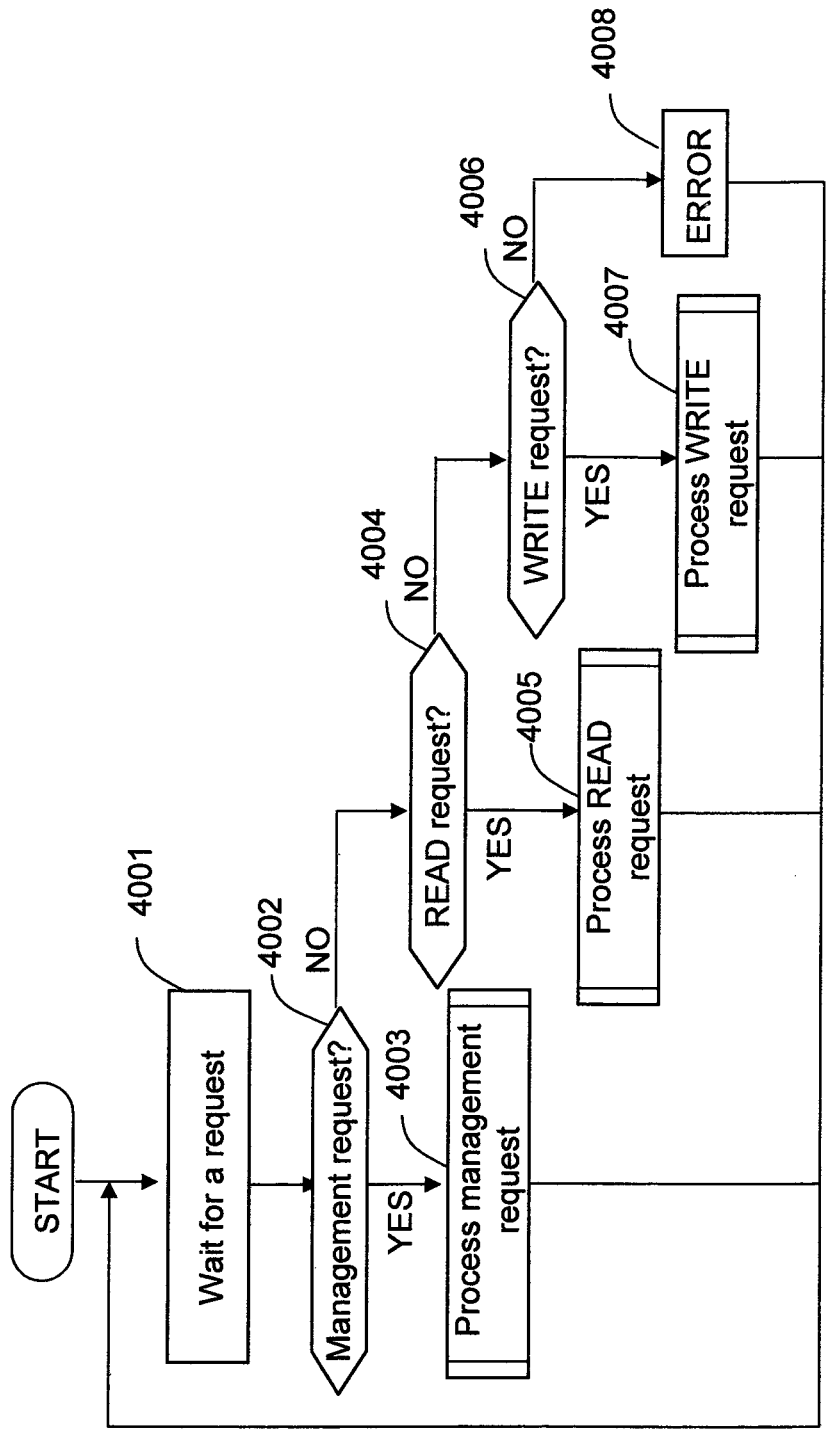
FIG. 4 shows an example of a process flow diagram for the storage system control program.

FIG. 4 shows an example of a process flow diagram for the storage system control program 2007. The program receives a request (4001) from the application server or management server. If it receives a management request (4002) from the management server 1001, a block-based READ request (4004) from the application server 1000, or a block-based WRITE request (4006) from the application server 1000, it processes the request respectively (4003, 4005, or 4007). Otherwise, it returns an error (4008).

Figure 5:
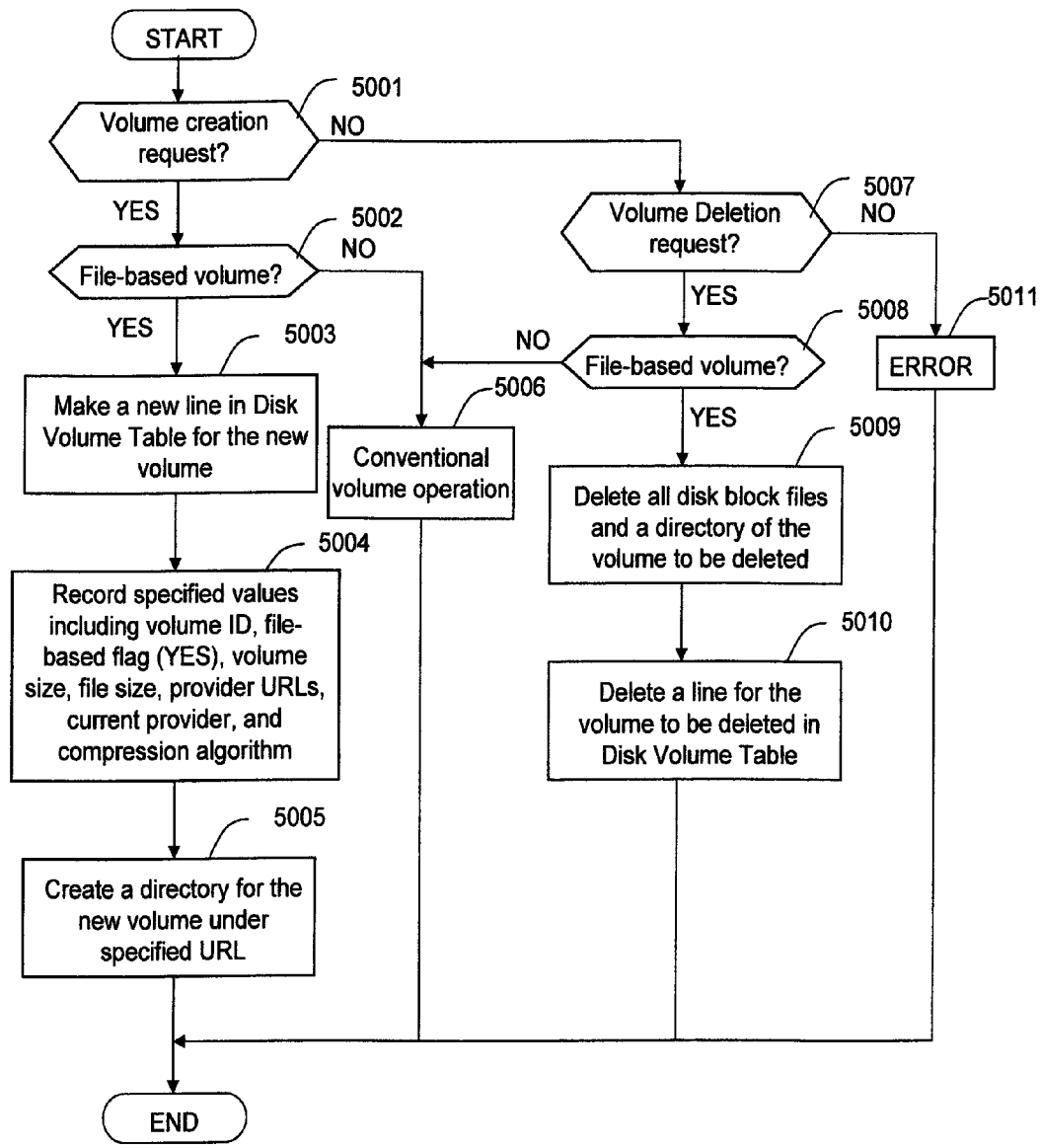
FIG. 5 shows an example of a process flow diagram for the process of management request at step 4003 of FIG. 4.

FIG. 5 shows an example of a process flow diagram for the process of management request at step 4003 of FIG. 4. If the request received is a volume creation request (5001) and the request indicates the creation of a file-based volume, i.e., a block-based thin provisioning disk volume whose disk blocks are stored as files in the second storage system (5002), the storage system control program 2007 inserts a new line in the disk volume table 2008 for the new volume to be created (5003) and records the values including volume ID, file-based flag (YES), volume size, file size, provider URLs, current provider, and compression algorithm which are specified by an administrator in the request (5004). The URL of the second provider site may be N/A which means there is no replication site. Finally, the storage system control program 2007 creates a new directory which has, as shown in FIG. 6a, 6003, a name of the volume ID and is located under <base URL>/<storage ID> (5005). The creation of a directory in a provider site can be implemented by using, for example, the MKCOL method of the WEBDAV protocol.

If the request received is a volume deletion request (5007) and the request indicates the deletion of a file-based volume (5008), the storage system control program 2007 in the storage service provider deletes all disk block files and a directory which compose the specified volume (5009). The deletion can be implemented by using, for example, the DELETE method of the WEBDAV protocol. The storage system control program 2007 also deletes a line of the volume in the disk volume table 2008 (5010).

If the request received is a volume creation or deletion request and the request does not indicate a file-based volume, the storage system control program 2007 performs a conventional volume operation which may include the allocation or release of a storage area in the disk drives 2006 in FIG. 2 (5006). Step 5006 can be implemented by using any well-known technology which is outside the scope of this discussion. If the request does not fall within any of the above categories, the storage system control program 2007 returns an error (5011).

Figure 7:
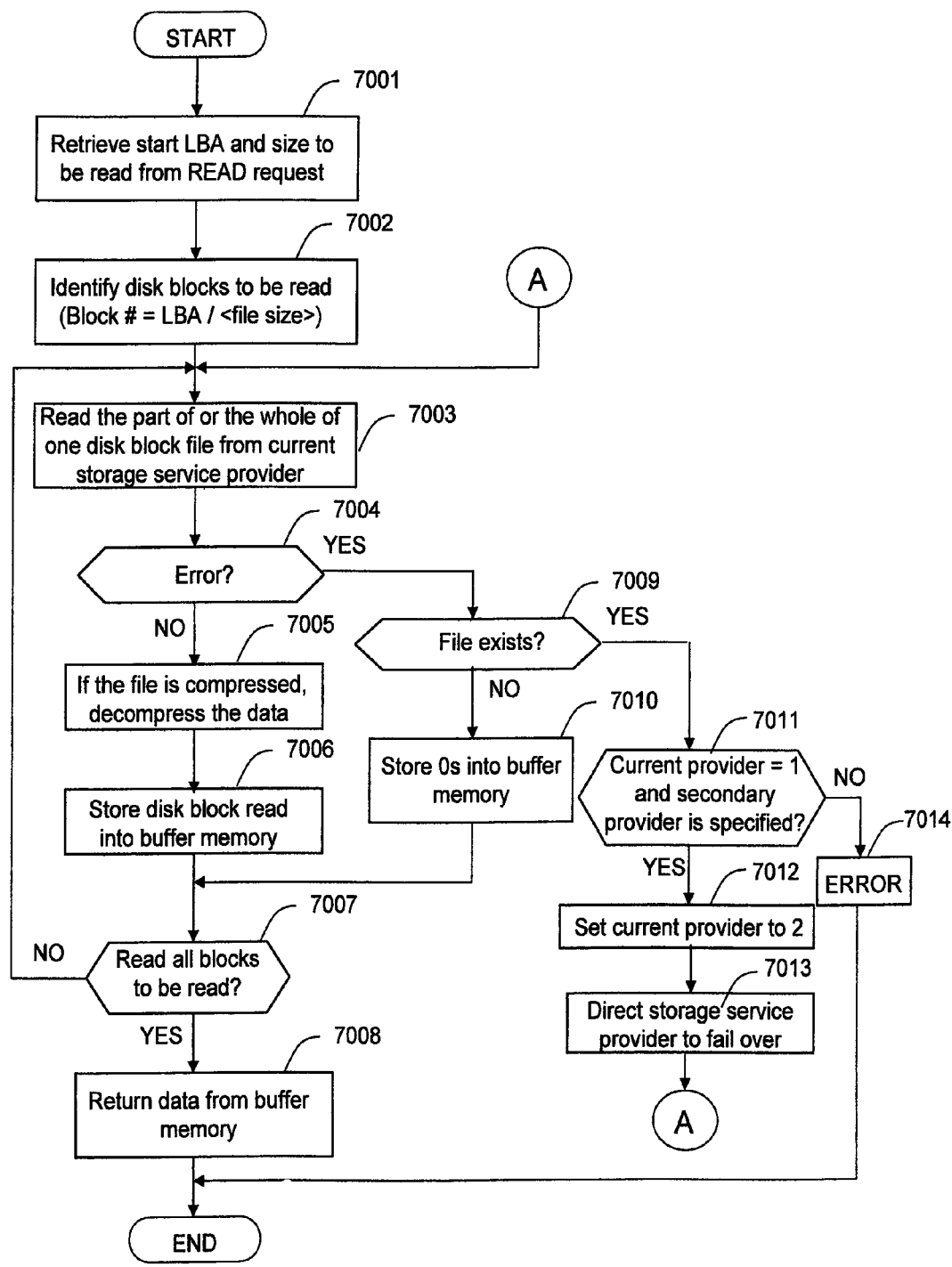
FIG. 7 shows an example of a process flow diagram for the READ request in step 4005 of FIG. 4 according to the first embodiment.

FIG. 7 shows an example of a process flow diagram for the READ request in step 4005 of FIG. 4. When a READ request is received, the storage system control program 2007 retrieves the start LBA and size of the data to be read from the request (7001) and identifies the disk blocks to be read by calculating the block number for each LBA included in the area to be read (7002). For each disk block to be read, the storage system control program 2007 reads it from the service provider site which is indicated in the disk volume table 2008 as the current provider (7003). The URL of the file can be generated as shown in FIG. 6a by using the information recorded in the disk volume table 2008 for the volume. The operation can be implemented by using, for example, the GET method of the WEBDAV protocol. If the range of LBAs to be read is not aligned with the file size (i.e., the first LBA and/or the next of the last LBA is not a multiple of the file size), a part of the file may be read instead of the whole of the file by specifying the range unless the file is compressed. That can be implemented by using, for example, the Range header of the GET method.

When the read operation of the file is completed successfully (7004), the storage system control program 2007 decompresses the data (7005), if it is compressed, and stores it into the buffer memory (7006). If the read operation fails (7004) and the error indicates that the file does not exist (7009), the storage system control program 2007 stores 0s of the size to be read in the buffer memory (7010) because the absence of the file means the disk block is not allocated in the thin provisioning volume. If some other error occurs and it is possible to fail over to the second service provider site (7011), the storage system control program 2007 switches the provider site to the second site (7012), directs the service provider to fail over (7013), and retries the operation. If it is not possible to fail over, the program returns an error (7014). After these steps are repeated for all disk blocks and all data to be read is stored in the buffer memory (7007), the storage system control program 2007 returns the requested data from the buffer memory to the application server 1000 (7008).

Figure 8:
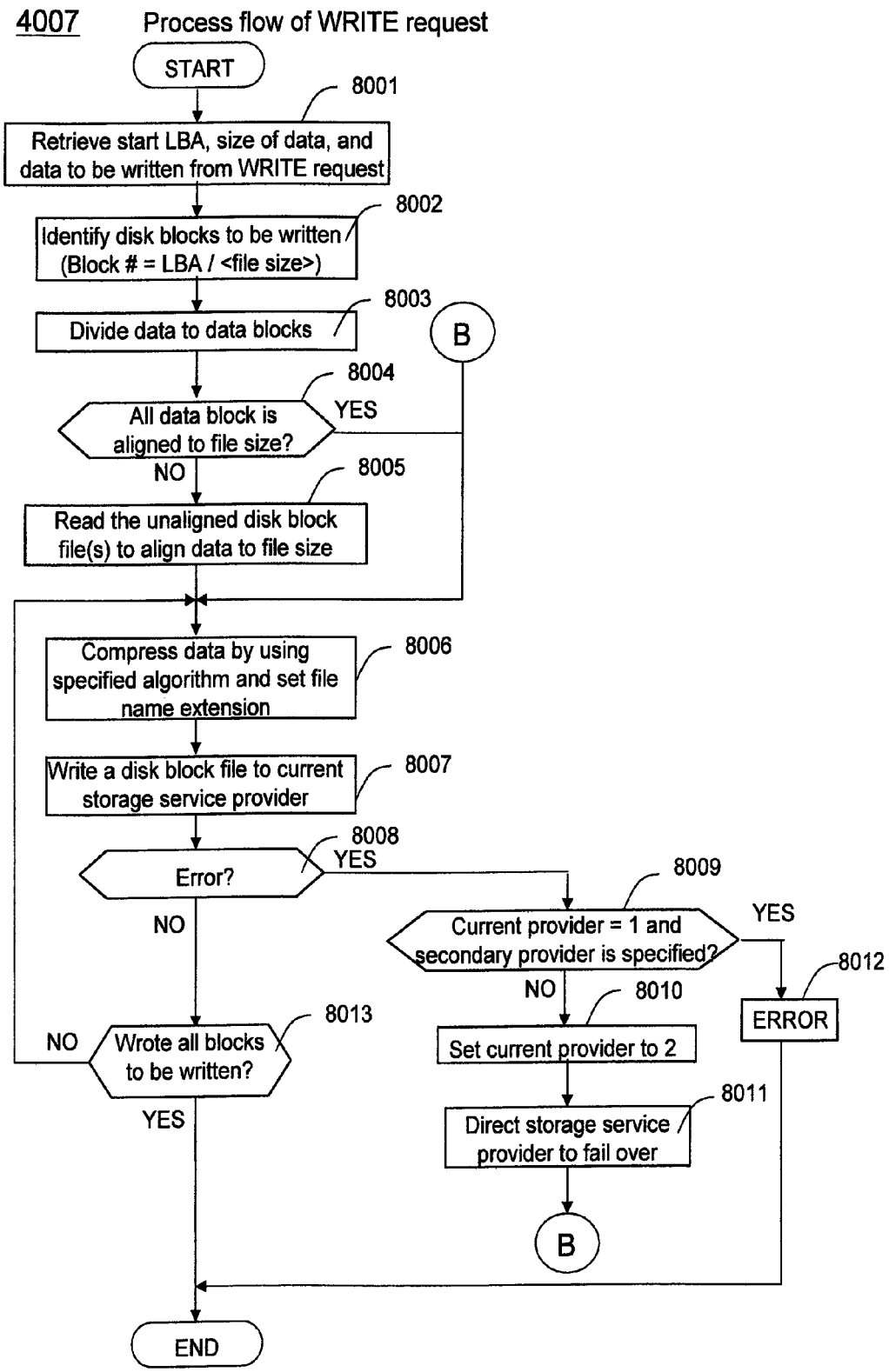
FIG. 8 shows an example of a process flow diagram for the WRITE request in step 4007 of FIG. 4 according to the first embodiment.

FIG. 8 shows an example of a process flow diagram for the WRITE request in step 4007 of FIG. 4. When a WRITE request is received, the storage system control program 2007 retrieves the start LBA, size of the data, and data to be written from the request (8001) and identifies the disk blocks to be written by calculating the block number for each LBA included in the area to be written (LBA/file size) (8002). The data is divided into disk blocks to store as disk block files (8003). If the range of LBAs to be written is not aligned with the file size (8004), the storage system control program 2007 reads the disk blocks which contain the unaligned part of the data (8005). They must be read even if the data is not compressed because the HTTP protocol used in this embodiment does not support partial update of a file. After all disk blocks to be written are aligned with the file size, for each disk block, the storage system control program 2007 compresses the data by using the algorithm specified in the disk volume table 2008 (8006) and writes it as a file (8007). The process to generate the URL of each file and the process to fail over in the case of error (8008-8012) are the same as described above in connection with the READ request (7011-7014). The above steps are repeated for all disk blocks to be written (8013).

As described above, a thin provisioning volume can be provided by using the file storage service without storing the block mapping information in the storage system, in order to reduce the amount of memory of the system and the cost of hardware. The replication of a thin provisioning volume can be implemented by using a simple file copy capability. Other file system operations such as snapshot are also applied in the same way. Furthermore, a user can build a new file system in the thin provisioning volume independent of the file management function supported by the storage service.

Second Embodiment

In the second embodiment, a NAS is used instead of an online storage service. Two storage systems are connected to two NAS servers and share the capacity of the NAS servers. Each disk block is stored as a file in the NAS. If a file system used for a volume is full, a file is created in another available file system and a symbolic link which refers to the file is created in the former file system. The sharing of the NAS allows a storage system to discover and import thin provisioning volumes managed by another storage system. The files in the NAS are accessed by using the NFS or CIFS protocol after mounting exported file systems. In this embodiment, the disk block files are divided into disk block groups. Each disk block group is contained in a directory in the NAS. The existence of a file is detected by referring to a directory instead of detecting an error of the read operation. The fail over function and data compression function are omitted for simplicity of the explanation. The difference from the first embodiment is described below.

Figure 9:
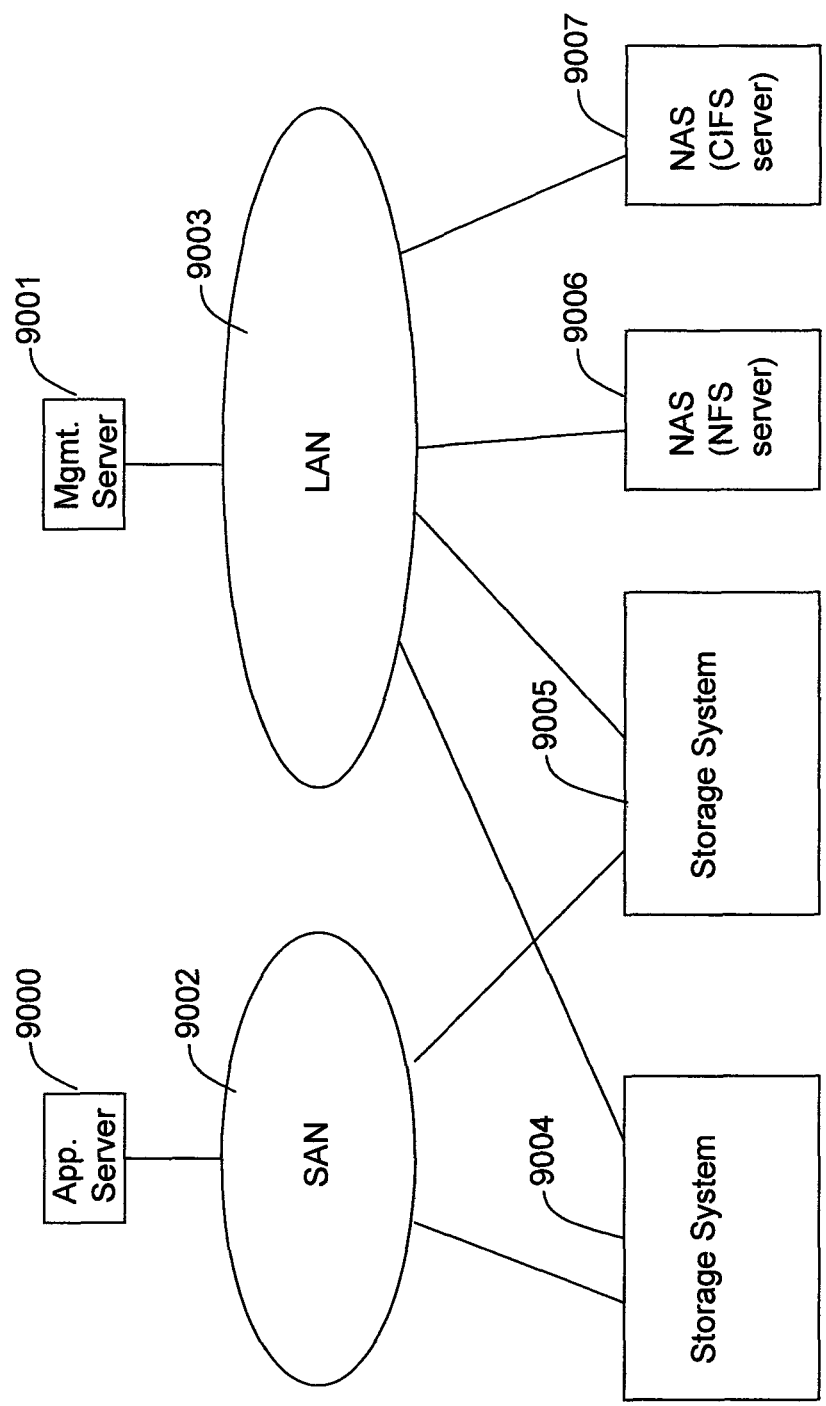
FIG. 9 illustrates an example of a hardware configuration of a computer system in which the method and apparatus of the invention may be applied according to a second embodiment of the invention.

FIG. 9 illustrates an example of a hardware configuration of a computer system in which the method and apparatus of the invention may be applied according to the second embodiment. Two storage systems (9004 and 9005) and two NAS servers (9006 and 9007) are connected through the LAN 9003. The storage systems 9004, 9005 share the capacity of the NAS and store disk block files of thin provisioning files in the NAS servers 9006, 9007.

Figure 10:
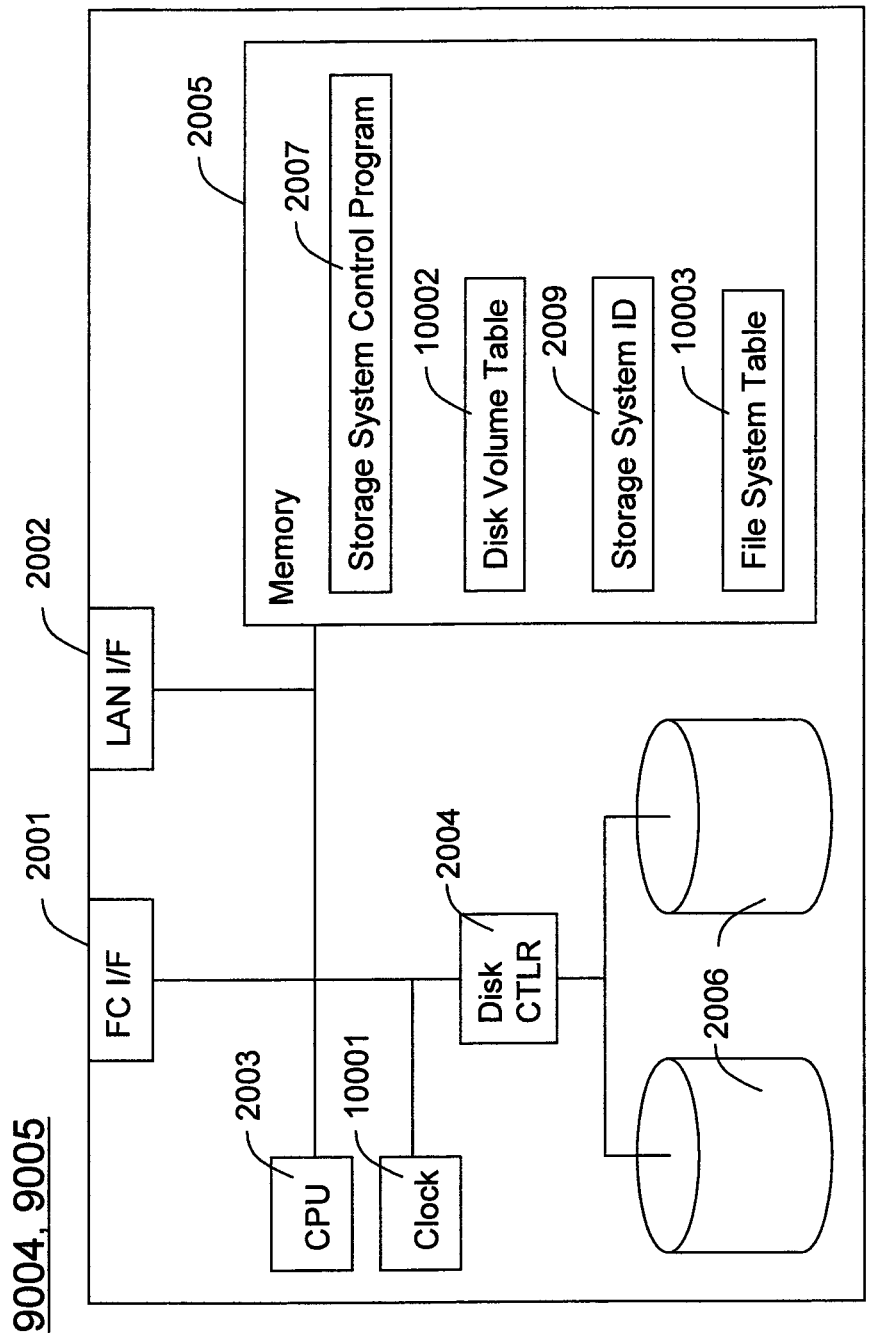
FIG. 10 shows the configuration of an exemplary storage system in the computer system of FIG. 9.

FIG. 10 shows the configuration of an exemplary storage system (9004 or 9005) in the computer system of FIG. 9. The storage system in this embodiment has a clock 10001 to provide the current time. It also has additional management information in file system table 10003. The disk volume table 10002 is also modified as shown in FIG. 11. The block group size 11001 in the file system table 10003 defines the number of disk block files in a disk block group. The base directory 11002 is used instead of the base URL in the first embodiment (FIG. 3).

The structure of file system table 10003 is shown in FIG. 12. For each file system in the NAS which is available to the storage system, the file system table 10003 contains the NAS address 12001 which is an FQDN or IP address of the NAS, the file system 12002 which is exported, a mount point 12003 which is a mount point of the file system, a protocol 12004 which is the protocol used to access the file system, and an available capacity 12005 which contains the usable capacity of the file system.

In the second embodiment, every file system recorded in the file system table 10003 is mounted at the specified mount point so that each disk block file can be identified by a file path as shown in FIG. 13*a*. Compared to the first embodiment (FIG. 6*a*), the block group number 13004 is added in the path. The disk block files are divided into groups by using the expression shown in FIG. 13*b*. FIG. 13*c* shows an example of the file name and block group number for each LBA when the file size is 2 (1 kB) and the block group size is 4. In this case, each four disk block files are stored in a directory whose name is the block group number 13004 as seen in FIG. 13*a*. Each directory of a disk block group in one volume is stored in the same directory whose name is the volume ID 13003 as seen in FIG. 13*a*.

Figure 14A:
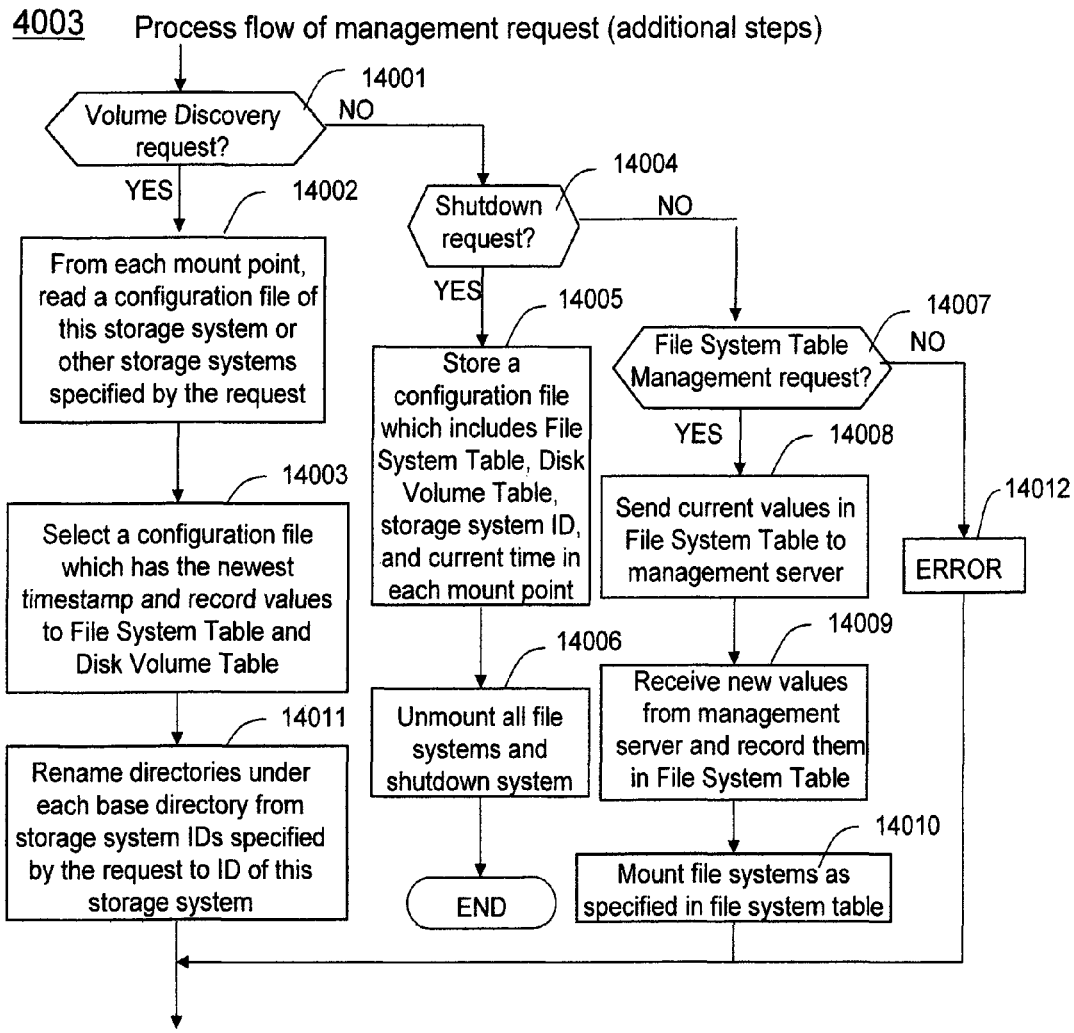
FIG. 14a shows an example of a process flow diagram for additional steps of the management request.

FIG. 14*a* shows an example of a process flow diagram for additional steps of the management request. In this embodiment, the steps shown in FIG. 14*a* replace step 5011 of FIG. 5 in the first embodiment. If the request received from the management server 1001 is a volume discovery request (14001), the storage system control program 2007 reads a configuration file which is to be stored in each mount point, as described later (14002). If the request does not specify any storage system ID, the storage system control program 2007 reads configuration files which contain the ID of the storage system. Otherwise, if the request specifies one or more IDs of the storage system(s), the storage system control program 2007 reads configuration files which contain any of the IDs. This means the import of volumes managed by other storage systems to this storage system. If the configuration files are not identical, the program selects one which has the newest time stamp and records the values contained in the file to the file system table 10003 and the disk volume table 10002 (14003). Finally, the program renames the directories whose names are the IDs of the specified storage system to the ID of this storage system (14011).

If the request received from the management server 1001 is a shutdown request (14004), the storage system control program 2007 stores a configuration file which includes the content of the file system table 10003 and the disk volume table 10002, storage system ID 2009, and current time into each mount point (14005) to save the configuration information. Then, the storage system control program 2007 unmounts all file systems and shutdown system (14006). These steps allow thin provisioning volumes managed by a storage system to be migrated to another storage system, i.e., a user indicates the first storage system to shut down and indicates the second storage system to discover volumes by specifying the IDs of the first and second storage systems.

If the request received from the management server 1001 is a file system table management request (14007), the storage system control program 2007 sends the current content of the file system table 10003 to the management server 1001 (14008). The program receives new content and stores it in the file system table 10003 (14009) and mounts file systems as specified in the file system table 10003 (14010). These steps allow the user to manage the file systems to be used and the mount points.

Figure 14B:
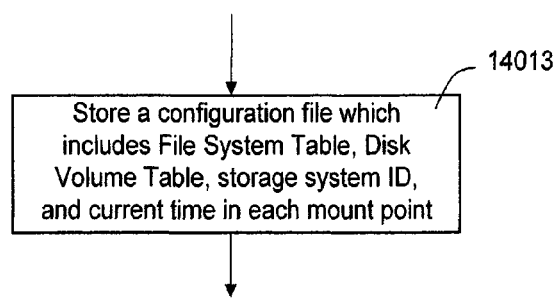
FIG. 14b shows step 14013 which is added at the end of FIG. 5 to update the configuration files after the management operation.

Step 14013 shown in FIG. 14b is added at the end of FIG. 5 to update the configuration files after the management operation.

Figure 15:
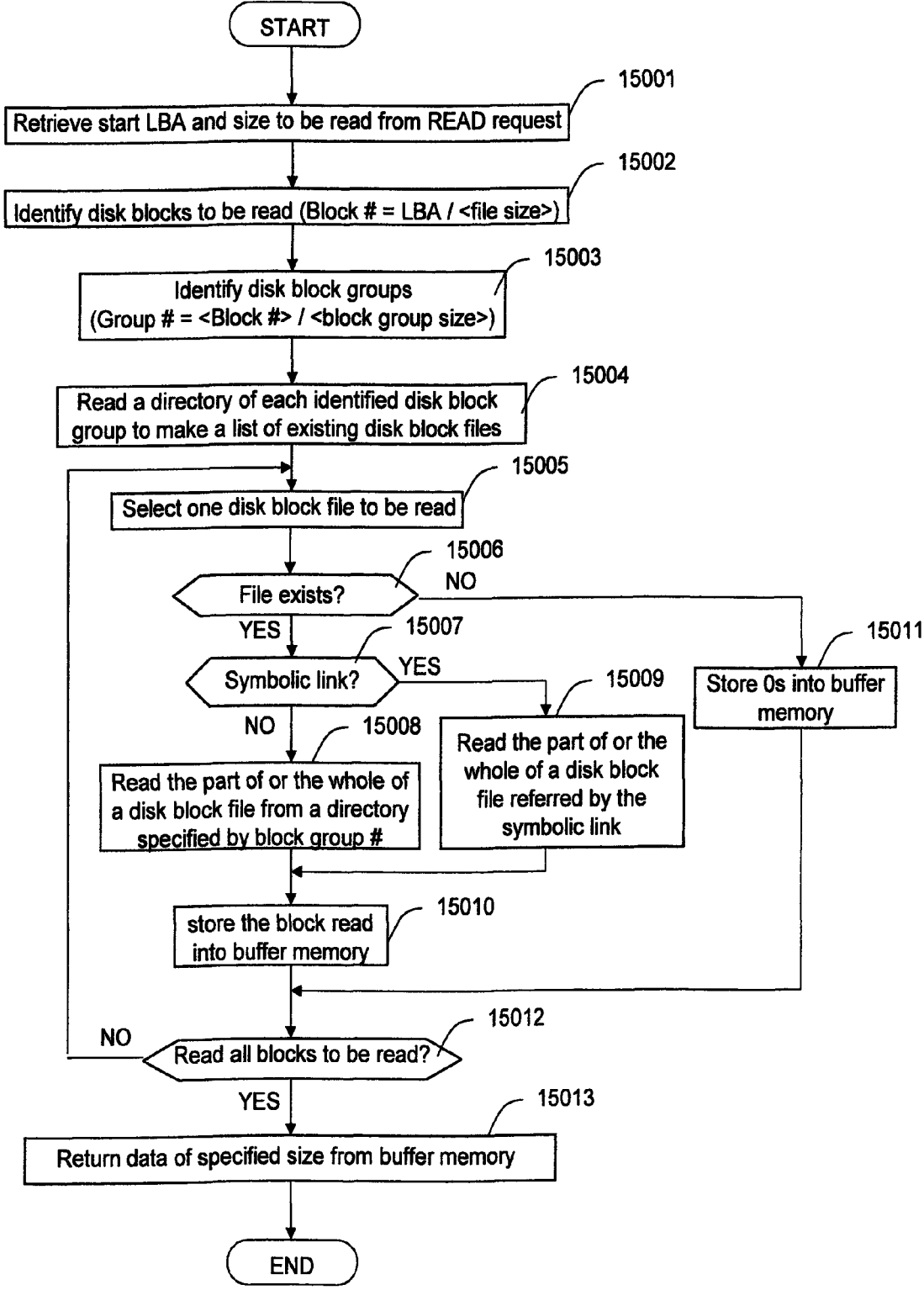
FIG. 15 shows an example of a process flow diagram for the READ request in step 4005 of FIG. 4 according to the second embodiment.

FIG. 15 shows an example of a process flow diagram for the READ request in step 4005 of FIG. 4 according to the second embodiment. When a READ request is received, the storage system control program 2007 retrieves the start LBA and size of the data to be read from the request (15001) and identifies the disk blocks to be read by calculating the block number for each LBA included in the area to be read (15002). The storage system control program 2007 identifies the disk block group for each disk block to be read (15003). It also reads a directory of each identified disk block group to make a list of existing disk block files (15004). The location of the directory to be read is identified as 13004 in FIG. 13a. The storage system control program 2007 selects one disk block file to be read (15005). The storage system control program 2007 checks for the existence of each disk block file by referring to the list made in step 15004. If the file exists (15006) and it is not a symbolic link (15007), the program reads the part or the whole of a disk block file from a directory specified by the block group number (15008). If the file exists (15006) but it is a symbolic link (15007), it reads a file which is referred by the link (15009). After step 15008 or 15009, the program stores the block read into the buffer memory (15010). On the other hand, if the file does not exist (15006), the program stores "0"s into the buffer memory (15011). After these steps are repeated for all disk blocks and all data to be read is stored in the buffer memory (15012), the storage system control program 2007 returns the requested data from the buffer memory to the application server 1000 (15013).

Figure 16:
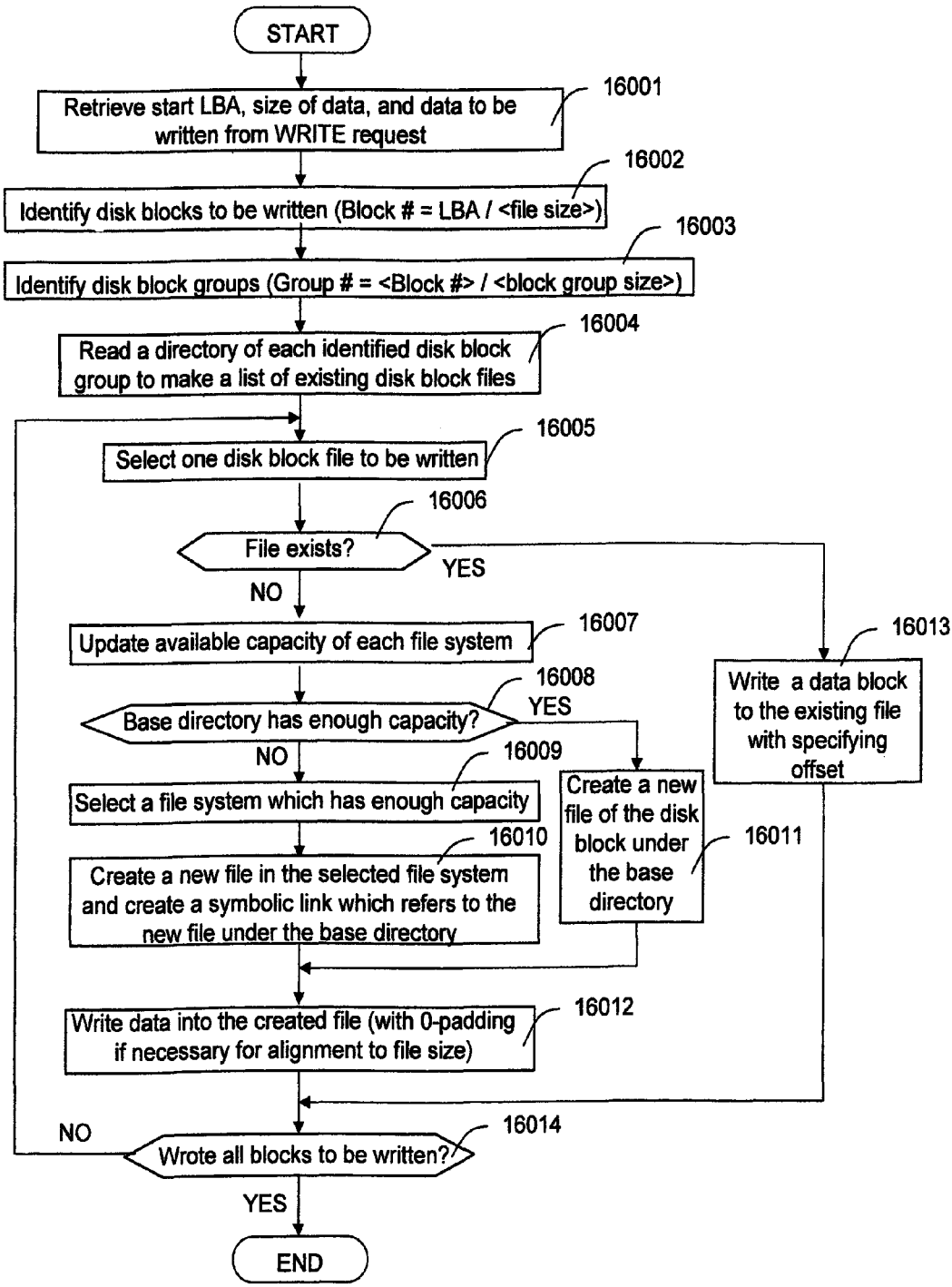
FIG. 16 shows an example of a process flow diagram for the WRITE request in step 4007 of FIG. 4 according to the second embodiment.

FIG. 16 shows an example of a process flow diagram for the WRITE request in step 4007 of FIG. 4 according to the second embodiment. When a WRITE request is received, the storage system control program 2007 retrieves the start LBA, size of the data, and data to be written from the request (16001), identifies the disk blocks to be written by calculating the block number for each LBA included in the area to be read (LBA/file size) (16002), and identifies the disk block groups by calculating the group number for each block (block number/block group size) (16003). The storage system control program 2007 checks for the existence of each disk block file to be written by reading a directory of each disk block (16004). The storage system control program 2007 selects one disk block file to be written (16005). If a file already exists (16006), it updates the file with new data (16013). If the data is not aligned with the file size, the program updates the file specifying offset and size. If the file does not exist, the program creates a new file. At first, it updates the available capacity of each file system (16007). If the file system which contains the base directory has enough capacity (16008), it creates a new file in the file system (16011). If a directory of its disk block group does not exist, it creates the directory before the creation of the file. If the file system does not have enough capacity, the storage system control program 2007 selects a file system which has enough capacity (16009). It creates a file in the file system and a symbolic link which refers to the file in the original file system (16010). Again, if any of parent directories does not exist, the program creates the directory before the creation of the file. After the creation of the file, the program writes the data into the file (16012). If the data is not aligned with the file size, the data is padded by 0s. The above steps are repeated for all disk blocks to be written (16014).

As described above, a thin provisioning volume can be provided by using NAS servers without storing block mapping information in the storage system to reduce the amount of memory of the system and the cost of hardware. The migration of thin provisioning volumes between storage systems can be implemented by sharing file systems exported by the NAS. Furthermore, the data in a thin provisioning volume can be stored in multiple file systems. That allows the volume to store more data than the capacity of one file system.

Of course, the system configurations illustrated in FIGS. 1, 2, 9, and 10 are purely exemplary of information systems in which the present invention may be implemented, and the invention is not limited to a particular hardware configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for managing and operating block-based thin provisioning disk volumes in file-based storage systems. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. A method of operating block-based thin provisioning disk volumes in a system including a first storage system which is connected via a network to a second storage system, the method comprising:
   in response to a volume creation request to create a thin provisioning disk volume in the first storage system, recording in the first storage system attribute information of a block-based thin provisioning disk volume;
   storing disk blocks of the block-based thin provisioning disk volume as disk block files in a file system in the second storage system, the disk block files being read and written using HTTP-based protocol, each disk block file being identified by a file path:
   specifying a directory path for the block-based thin provisioning disk volume; and
   creating a directory for the block-based thin provisioning disk volume under the specified directory path;
   wherein creation of the directory in the second storage system is done by sending a HTTP request from the first storage system to the second storage system.

2. A method according to claim 1, wherein the attribute information of the block-based thin provisioning disk volume is stored in a disk volume table and comprises at least one of:
   a volume ID of the block-based thin provisioning disk volume;
   a file-based flag indicating that each disk block in the block-based thin provisioning disk volume is stored as a disk block file in the file system in the second storage system;
   a volume size of said each disk block;
   a file size representing a number of sectors in each disk block file stored in the second storage system;
   a part of a file path for each disk block file stored therein; or
   a compression algorithm for compressing data in each disk block.

3. A method according to claim 1, wherein the disk block files are grouped into disk block groups and the file path of a disk block file for a disk block includes a disk block group number of the disk block group to which the disk block belongs, and wherein the attribute information of the block-based thin provisioning disk volume further comprises at least one of:
   for each disk block group, a disk block group size which defines a number of disk block files in the disk block group; or
   for each disk block group, a base directory for the disk block group.

4. A method according to claim 1, wherein the second storage system is one of a plurality of storage service providers,
   wherein the file path is a URL which includes a base URL of the second storage system, a storage ID of the first storage system, a volume ID of the block-based thin provisioning disk volume in the first storage system, a file name including or based on a disk block number of the disk block stored as the disk block file in the second storage system, and an extension representing a compression algorithm used to compress the disk block, and wherein the attribute information of the block-based thin provisioning disk volume further comprises a current provider indicating the storage service provider currently accessed.

5. A method according to claim 1,
   wherein the second storage system is one of a plurality of network-attached storage systems, and
   wherein the file path includes a base directory for each file system in the network-attached storage systems.

6. A method according to claim 1, further comprising:
   in response to a volume deletion request to delete a block-based thin provisioning disk volume in the first storage system, deleting all disk block files and the directory stored in the second storage system for the block-based thin provisioning disk volume specified in the volume deletion request, and deleting the attribute information of the block-based thin provisioning disk volume.

7. A method according to claim 1, further comprising:
   receiving a request selected from the group consisting of a volume discovery request, a shutdown request, and a file system table management request;
   if the request is a volume discovery request, reading a configuration file which contains ID of one or more storage systems specified in the volume discovery request or ID of the first storage system which receives the volume discovery request from each file system exported by the second storage system, selecting a configuration file from the read configuration files which has a newest timestamp and recording values of the selected configuration file to a file system table for recording file system information of the second storage system and a disk volume table for storing attribute information of the block-based thin provisioning disk volume, and renaming directories under each base directory from an ID specified in the configuration file to an ID of the first storage system;
   if the request is a shutdown request, storing a configuration file which includes a file system table for recording file system information of the second storage system, a disk volume table for storing attribute information of the block-based thin provisioning disk volume, a storage system ID of the first storage system, and a current time in each file system which is recorded in the file system table, and unmounting all file systems and shutting down the first storage system; and
   if the request is a file system table management request, sending current values in a file system table for recording file system information of the second storage system to a management server connected to the network, receiving new values from the management server and recording the new values in the file system table, and mounting file systems specified in the file system table.

8. A method according to claim 1, in response to a block read request to read data in the block-based thin provisioning disk volume in the first storage system, further comprising:

retrieving a start logical block address and size to be read from the read request;

identifying one or more disk block files of the block-based thin provisioning disk volume to be read;

reading each disk block file from the second storage system;

if the reading is successful, storing the disk block read into a buffer memory;

if the reading fails because the disk block file of the block-based thin provisioning disk volume to be read does not exist, storing zeros into a buffer memory; and returning the data stored in the buffer memory to an application server.

9. A method according to claim 1, in response to a block write request to write data in the block-based thin provisioning disk volume in the first storage system, further comprising:

retrieving a start logical block address, size of data, and data to be written from the write request;

identifying one or more disk block files of the block-based thin provisioning disk volume to be written;

dividing the data into data blocks; and writing each of the divided data blocks as the identified disk block file to the second storage system.

10. A system of operating block-based thin provisioning disk volumes, the system comprising:

a first storage system;

a second storage system; and a network connecting the first storage system and the second storage system;

wherein, in response to a volume creation request to create a thin provisioning disk volume in the first storage system, the first storage system records attribute information of the block-based thin provisioning disk volume in the first storage system;

wherein disk blocks of the blocks-based thin provisioning disk volume are stored as disk block files in a file system in the second storage system, the disk block files being read and written using HTTP-based protocol;

wherein the first storage system specifies a directory path for the block-based thin provisioning disk volume;

wherein the first storage system creates a directory for the block-based thin provisioning disk volume under the specified directory path; and wherein creation of the directory in the second storage system is done by sending a HTTP request from the first storage system to the second storage system.

11. A system according to claim 10, wherein the attribute information of the block-based thin provisioning disk volume is stored in a disk volume table and comprises at least one of:

a volume ID of the block-based thin provisioning disk volume;

a file-based flag indicating that each disk block in the block-based thin provisioning disk volume is stored as a disk block file in the file system in the second storage system;

a volume size of said each disk block;

a file size representing a number of sectors in each disk block file stored in the second storage system;

a part of a file path for each disk block file stored therein; or a compression algorithm for compressing data in each disk block.

12. A system according to claim 10, wherein the first storage system:

in response to a volume deletion request to delete a block-based thin provisioning disk volume in the first storage system, deletes all disk block files and the directory stored in the second storage system for the block-based thin provisioning disk volume specified in the volume deletion request, and deleting the attribute information of the block-based thin provisioning disk volume.

13. A system according to claim 10, wherein the first storage system:

receives a request selected from the group consisting of a volume discovery request, a shutdown request, and a file system table management request;

if the request is a volume discovery request, reads a configuration file which contains ID of one or more storage systems specified in the volume discovery request or ID of the first storage system which receives the volume discovery request from each file system exported by the second storage system, selects a configuration file from the read configuration files which has a newest timestamp and recording values of the selected configuration file to a file system for recording file system information of the second storage system and a disk volume table for storing attribute information of the block-based thin provisioning disk volume, and renames directories under each base directory from an ID specified in the configuration file to an ID of the first storage system;

if the request is a shutdown request, stores a configuration file which includes a file system table for recording file system information of the second storage system, a disk volume table, for storing attribute information of the block-based thin provisioning disk volume a storage system ID of the first storage system, and a current time in each file system which is recorded in the file system table, and unmounts all file systems and shuts down the first storage system; and if the request is a file system table management request, sends current values in a file system table for recording file system information of the second storage system to a management server connected to the network, receives new values from the management server and recording the new values in the file system table, and mounts file systems specified in the file system table.

14. A system according to claim 10, wherein the first storage system:

retrieves a start logical block address and size to be read from the read request;

identifies one or more disk block files of the block-based thin provisioning disk volume to be read;

reads each disk block file from the second storage system;

if the reading is successful, stores the disk block read into a buffer memory;

if the reading fails because the disk block file of the block-based thin provisioning disk volume to be read does not exist, stores zeros into a buffer memory; and returns the data stored in the buffer memory to an application server.

15. A system according to claim 10, wherein the first storage system, in response to a block write request to write data in the block-based thin provisioning disk volume in the first storage system:

retrieves a start logical block address, size of data, and data to be written from the write request;

identifies one or more disk block files of the block-based thin provisioning disk volume to be written;

divides the data into data blocks; and writes each of the divided data blocks as the identified disk block file to the second storage system.

16. A computer-readable storage medium storing a plurality of instructions for controlling a data processor to operate block-based thin provisioning disk volumes in a system including a first storage system which is connected via a network to a second storage system, the plurality of instructions comprising:
  instructions that cause the data processor, in response to a volume creation request to create a thin provisioning disk volume in the first storage system, to record in the first storage system attribute information of the block-based thin provisioning disk volume;
  instructions that cause the data processor to specify a directory path for the block-based thin provisioning disk volume in a file system in the second storage system, wherein disk blocks of the block-based thin provisioning disk volume are stored as disk block files in a file system in the second storage system, the disk block files being read and written using HTTP-based protocol; and
  instructions that cause the data processor to create a directory for the block-based thin provisioning disk volume under the specified directory path, wherein creation of the directory in the second storage system is done by sending a HTTP request from the first storage system to the second storage system.

17. A computer-readable storage medium according to claim 16, wherein the plurality of instructions further comprise:
  instructions that cause the data processor, in response to a volume deletion request to delete a block-based thin provisioning disk volume in the first storage system, to delete all disk block files and the directory stored in the second storage system for the block-based thin provisioning disk volume specified in the volume deletion request, and delete the attribute information of the block-based thin provisioning disk volume.

18. A computer-readable storage medium according to claim 16, wherein the plurality of instructions further comprise:
  instructions that cause the data processor to receive a request selected from the group consisting of a volume discovery request, a shutdown request, and a file system table management request;
  instructions that cause the data processor, if the request is a volume discovery request, to read a configuration file which contains ID of one or more storage systems specified in the volume discovery request or ID of the first storage system which receives the volume discovery request from each file system exported by the second storage system, select a configuration file from the read configuration files which has a newest timestamp and recording values of the selected configuration file to a file system table for recording file system information of the second system and a disk volume, and rename directories under each base directory from an ID specified in the configuration file to an ID of the first storage system;
  instructions that cause the data processor, if the request is a shutdown request, to store a configuration file which includes a file system table for recording file system information of the second storage system, a disk volume table for storing attribute information of the block-based thin provisioning disk volume, a storage system ID of the first storage system, and a current time in each file system which is recorded in the file system table, and unmount all file systems and shutting down the first storage system; and
  instructions that cause the data processor, if the request is a file system table management request, to send current values in a file system table for recording file system information of the second storage system to a management server connected to the network, receive new values from the management server and recording the new values in the file system table, and mount file systems specified in the file system table.

19. A computer-readable storage medium according to claim 16, wherein the plurality of instructions further comprise, in response to a block read request to read data in the block-based thin provisioning disk volume in the first storage system:
  instructions that cause the data processor to retrieve a start logical block address and size to be read from the read request;
  instructions that cause the data processor to identify one or more disk block files of the block-based thin provisioning disk volume to be read;
  instructions that cause the data processor to read each disk block file from the second storage system;
  instructions that cause the data processor, if the reading is successful, to store the disk block read into a buffer memory;
  instructions that cause the data processor, if the reading fails because the disk block file of the block-based thin provisioning disk volume to be read does not exist, to store zeros into a buffer memory; and
  instructions that cause the data processor to return the data stored in the buffer memory to an application server.

20. A computer-readable storage medium according to claim 16, wherein the plurality of instructions further comprise, in response to a block write request to write data in the block-based thin provisioning disk volume in the first storage system:
  instructions that cause the data processor to retrieve a start logical block address, size of data, and data to be written from the write request;
  instructions that cause the data processor to identifying one or more disk block files of the block-based thin provisioning disk volume to be written;
  instructions that cause the data processor to divide the data into data blocks; and
  instructions that cause the data processor to write each of the divided data blocks as the identified disk block file to the second storage system.

* * * * *